April 5, 1927.

G. W. WILLIAMS ET AL 1,623,294

SOLDERING MACHINE

Filed April 30, 1924      9 Sheets-Sheet 7

Inventors
George W. Williams
Axel M. Walstrom
by Hewitt S. Dixon
Atty

April 5, 1927.

G. W. WILLIAMS ET AL 1,623,294

SOLDERING MACHINE

Filed April 30, 1924    9 Sheets-Sheet 8

Inventors
George W. Williams
Axel M. Walstrom
by Hewitt S. Dixon
Atty

April 5, 1927.
G. W. WILLIAMS ET AL
SOLDERING MACHINE
Filed April 30, 1924
1,623,294
9 Sheets-Sheet 9
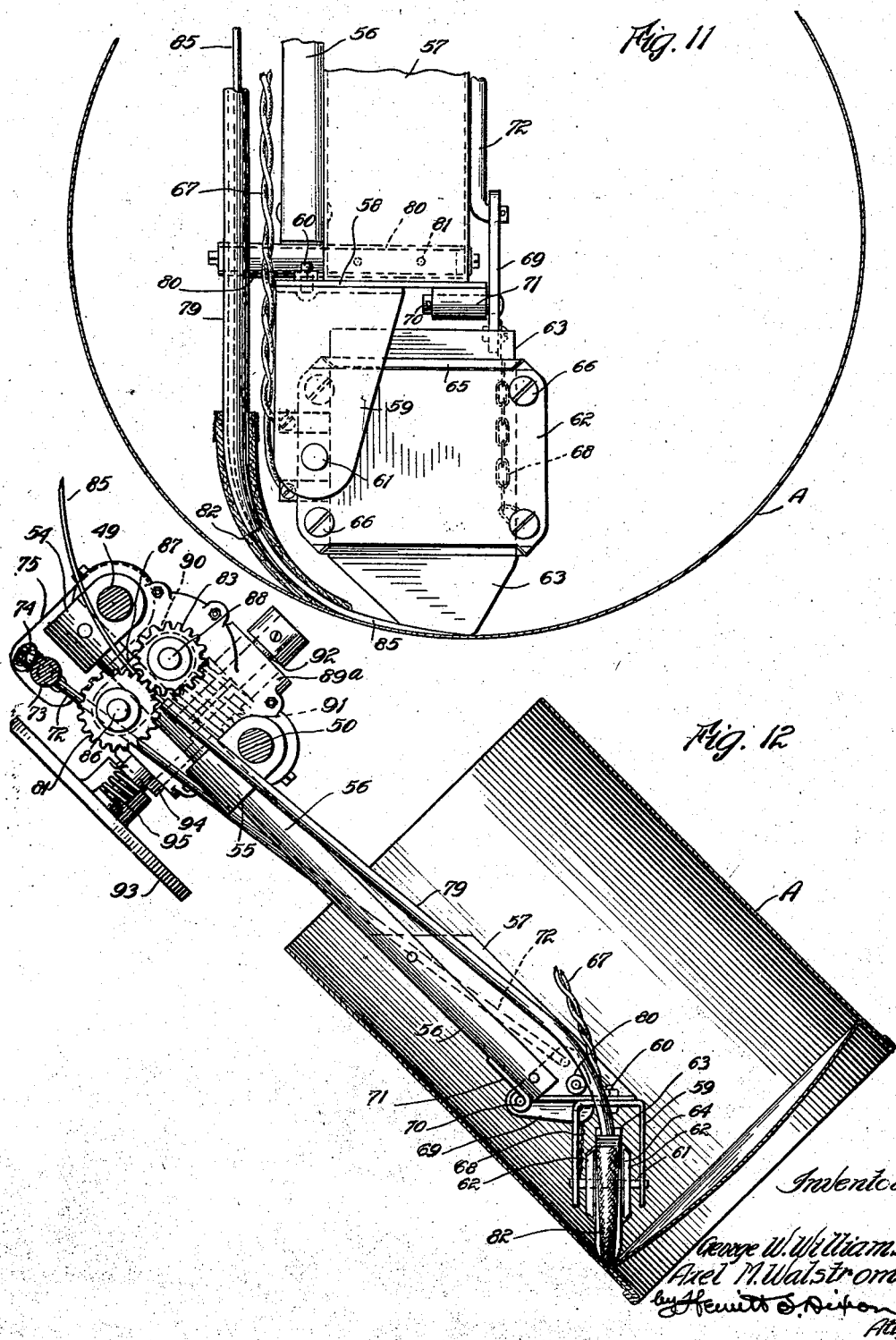

Patented Apr. 5, 1927.

1,623,294

UNITED STATES PATENT OFFICE.

GEORGE W. WILLIAMS, OF OAK PARK, ILLINOIS, AND AXEL M. WALSTROM, OF MINNEAPOLIS, MINNESOTA, ASSIGNORS TO THE CREAMERY PACKAGE MFG. COMPANY, OF CHICAGO, ILLINOIS, A CORPORATION OF ILLINOIS.

SOLDERING MACHINE.

Application filed April 30, 1924. Serial No. 710,005.

The invention relates to can soldering machines, more particularly to a machine for soldering the annular end seams in sheet metal cans.

Cans used as containers for highly perishable foods, such as milk and its products, should be smoothly finished, especially inside, to permit of their thorough cleansing. Any interior crevices or pockets about the joints of the can structure will retain bacteria laden accumulations difficult to remove and dangerous to the fresh contents of the cans. It is the practice to fill and strengthen the riveted, folded or welded can seams by the application of a covering of solder, of necessity on the inside of the can and preferably on the outside also. Heretofore, such soldering has been done manually with indifferent results as to effectiveness and smoothness, except at the hands of the most skillful artisans, and with considerable addition to the cost of the can in labor and material.

It is the object of this invention to provide a machine for the automatic application of solder to the inner side of the annular joint between the body portion and the end portion in a sheet metal can.

Further objects include the application of the solder with uniformity and smoothness; the consumption of a minimum amount of solder to accomplish satisfactory results with consequent economy of material; and a considerable saving in the cost of manufacturing the cans.

Other objects and advantages will be apparent in the following detailed description of a preferred embodiment of the invention which we have selected for illustration in the accompanying drawings. It will be understood, however, that many changes in form, construction and arrangement may be made by one skilled in the art without departing from the spirit and scope of the invention as expressed in the appended claims.

Figure 1:
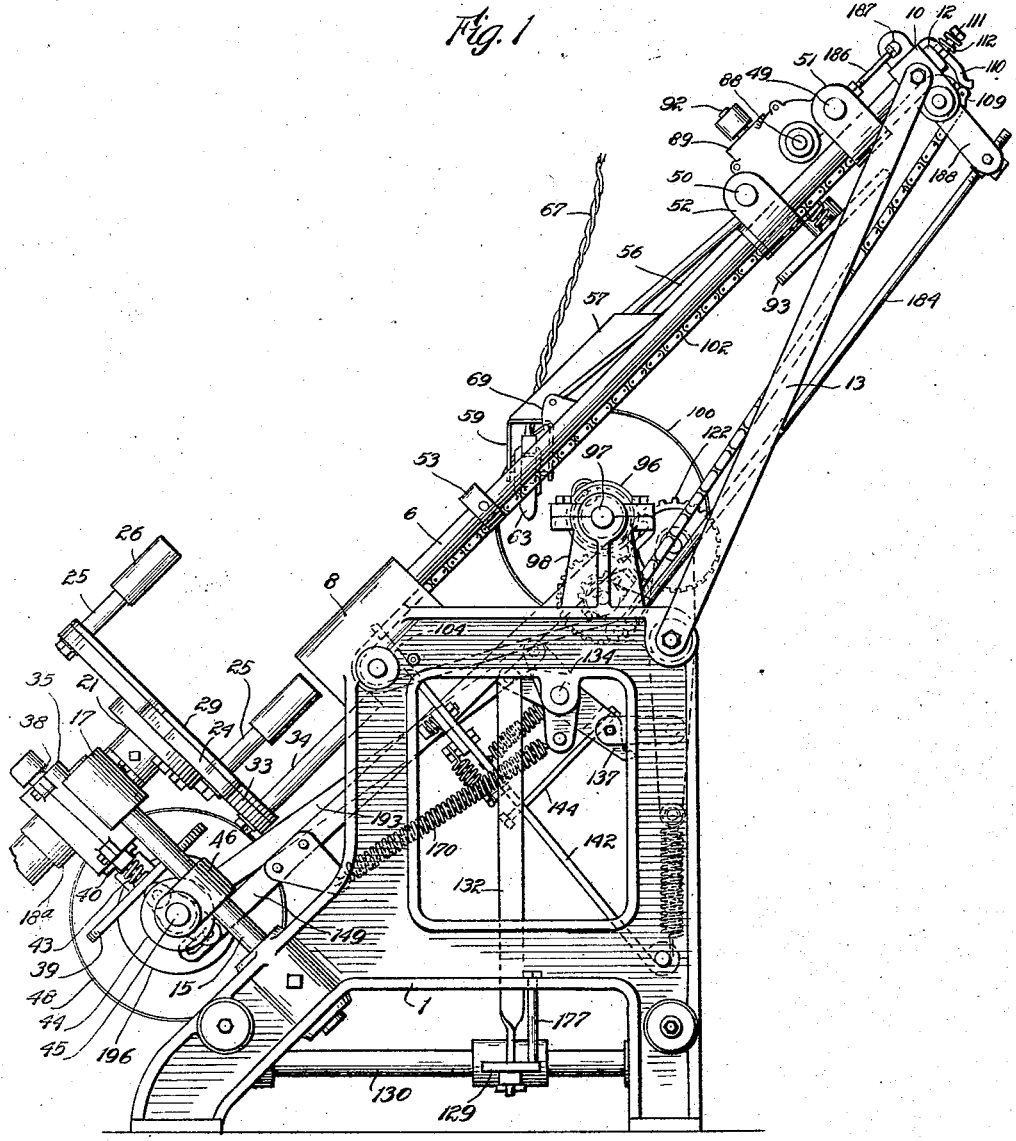
Figure 2:
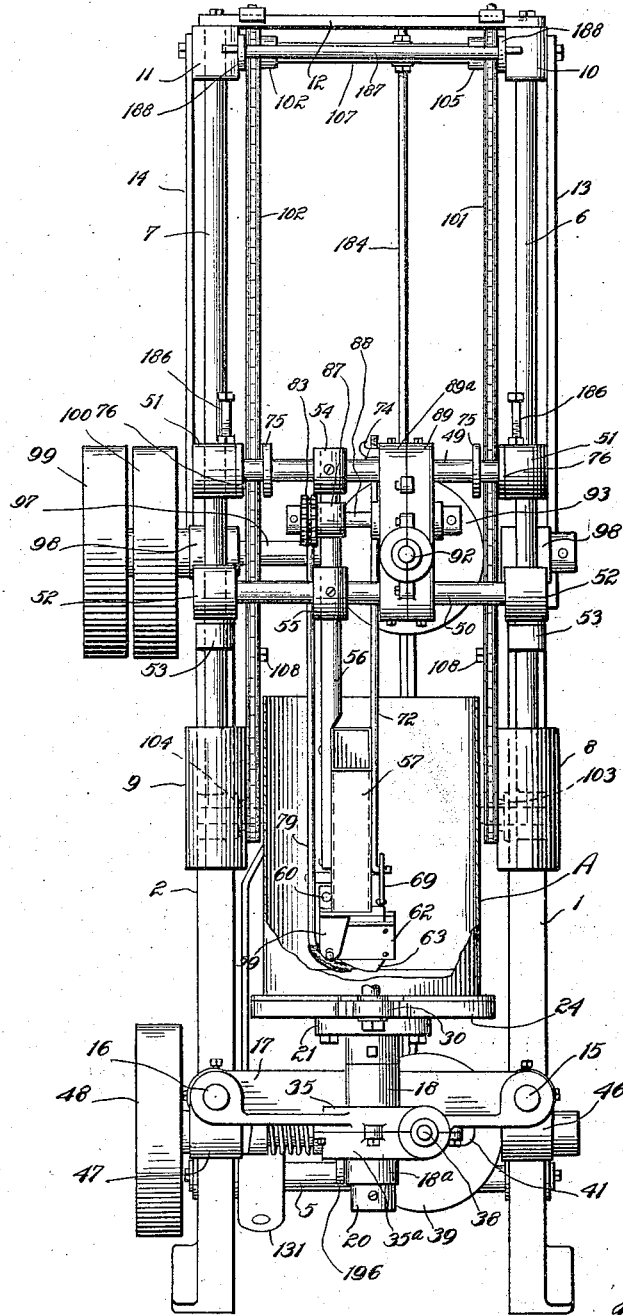
Figure 3:
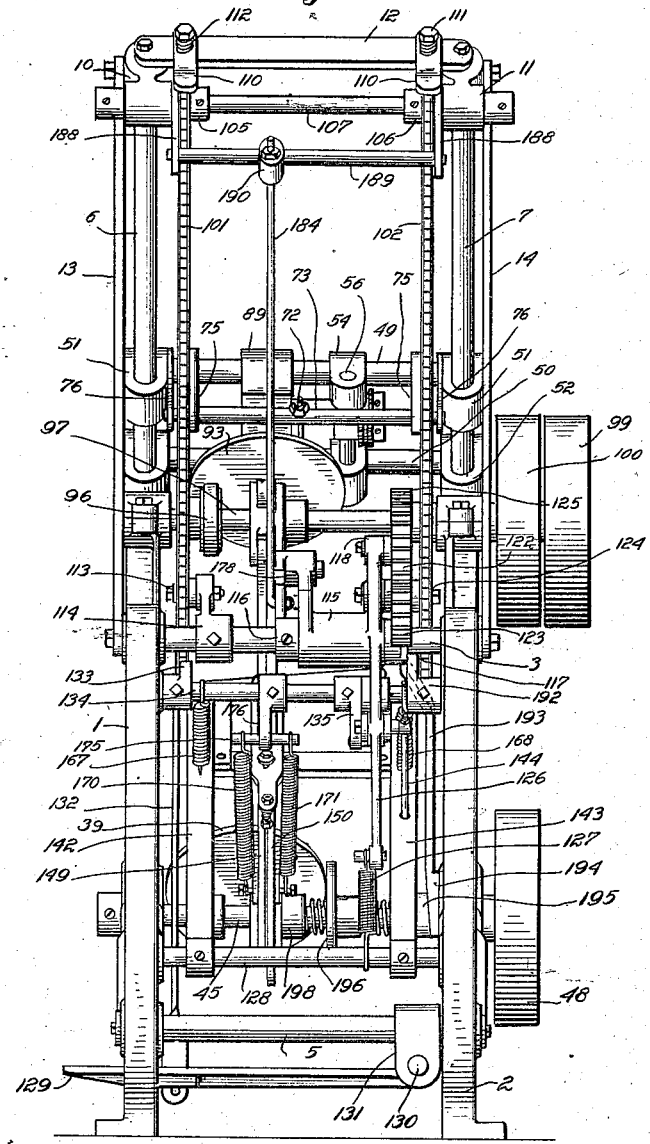
Figure 4:
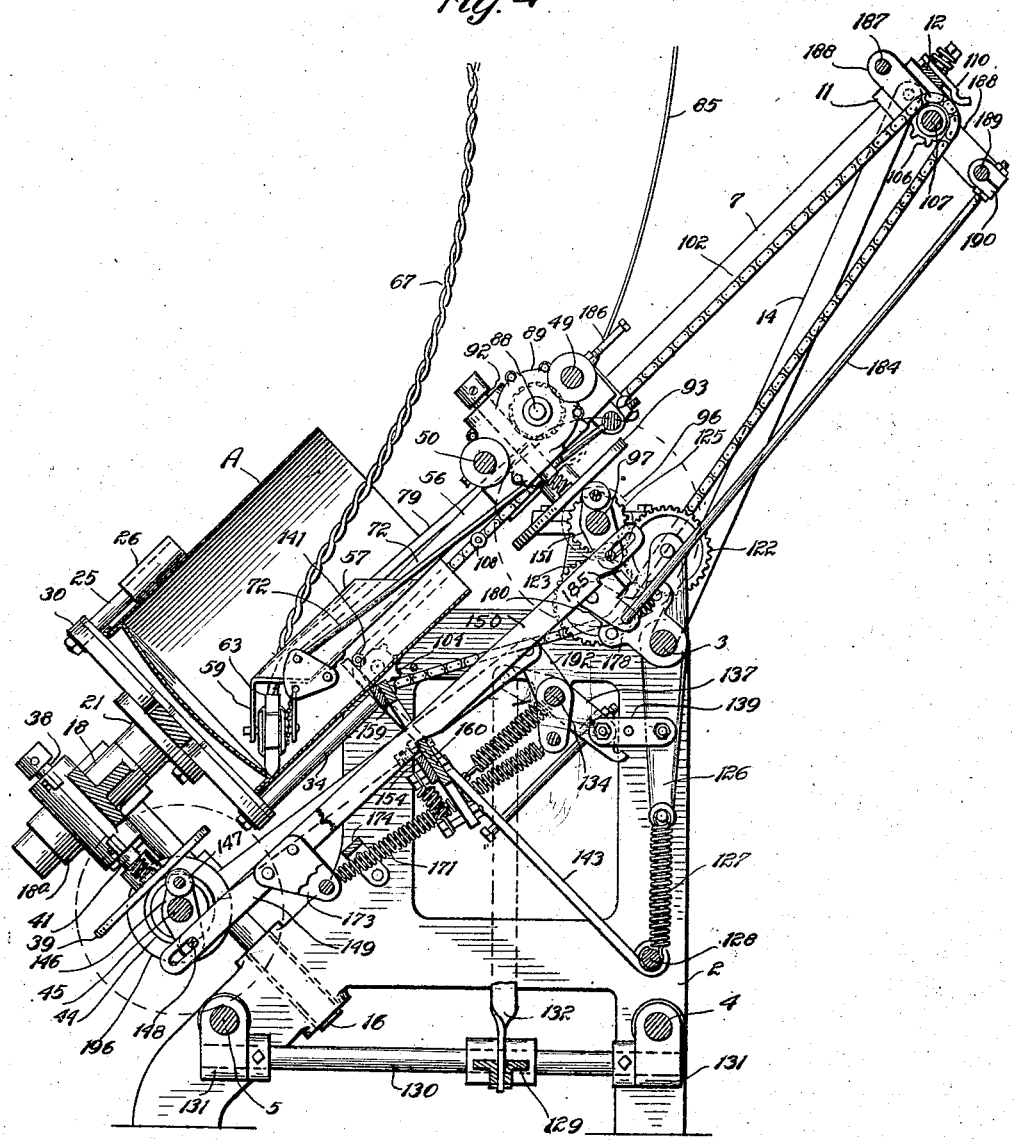
Figure 5:
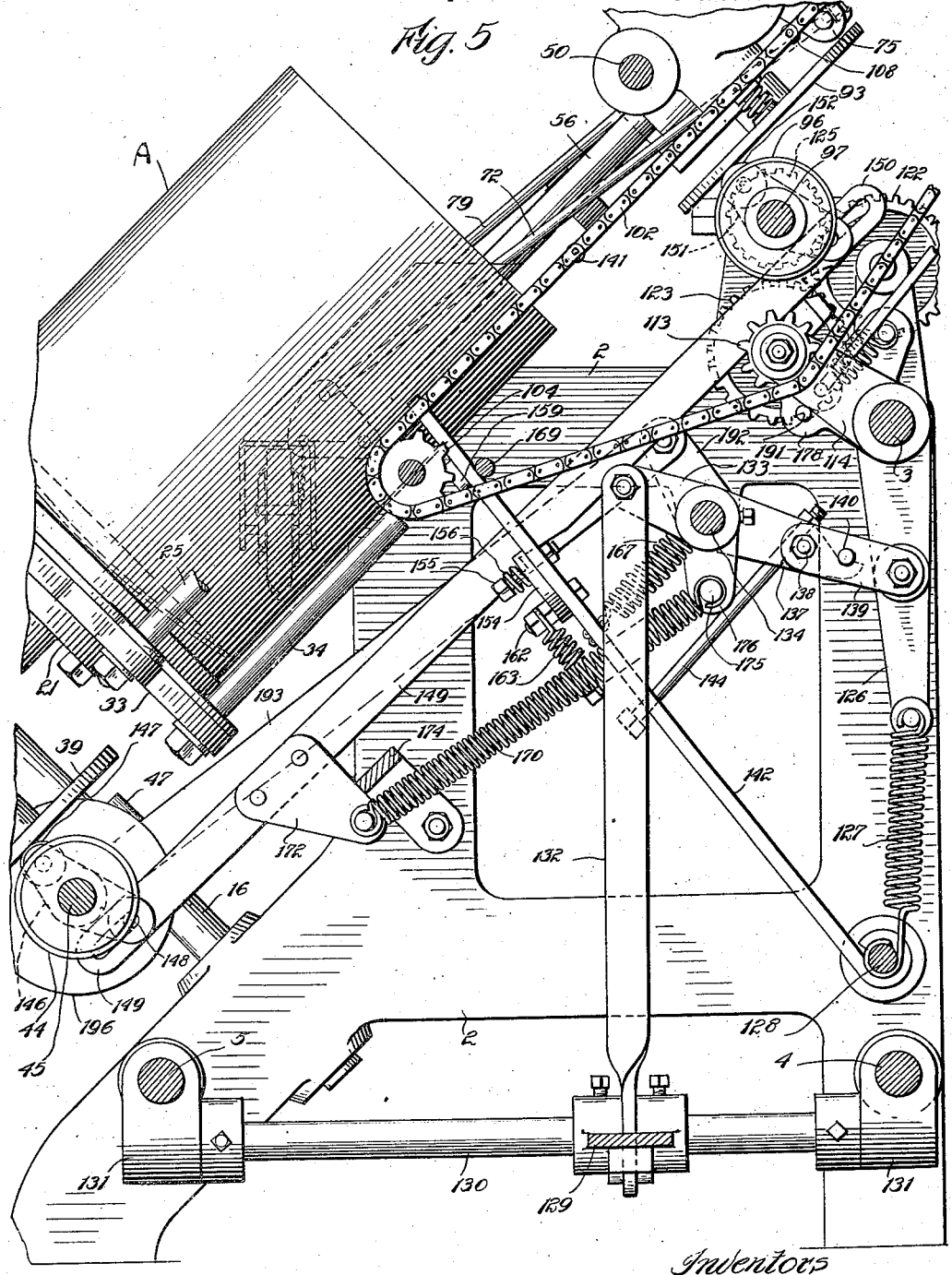
Figure 6:
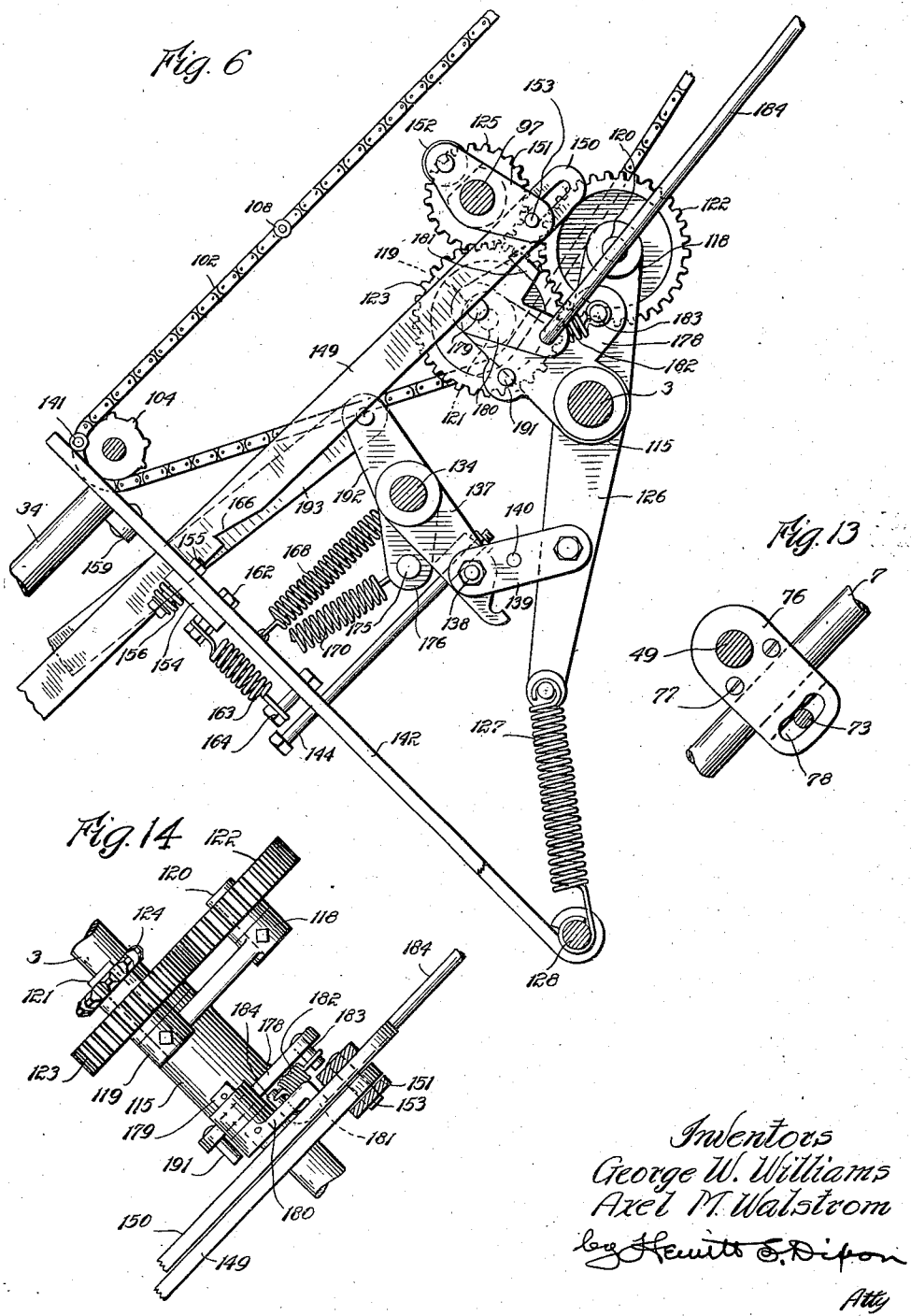
Figure 7:
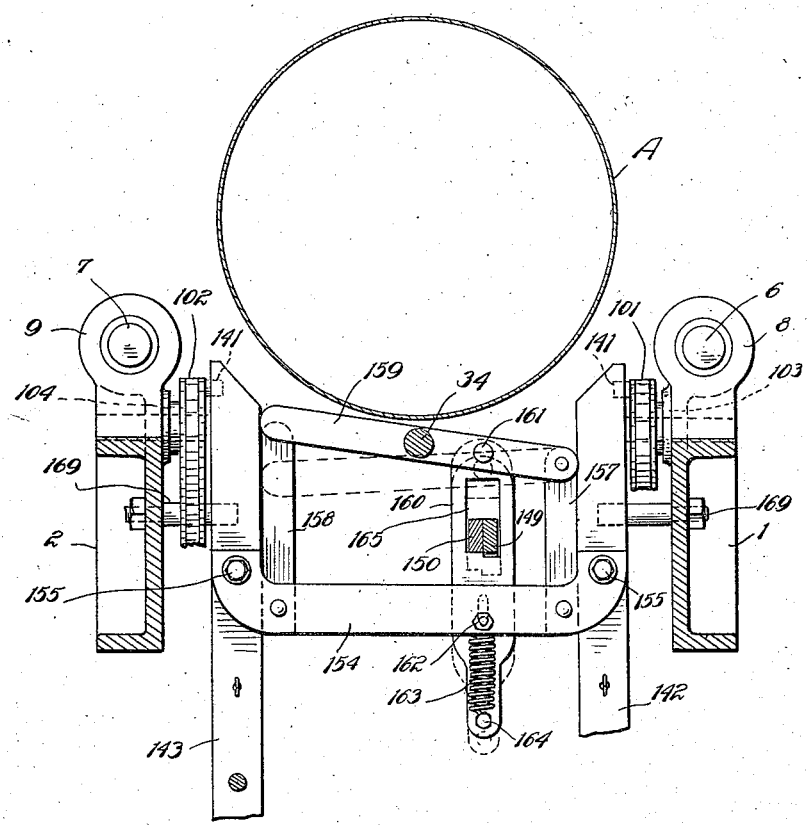
Figure 15:
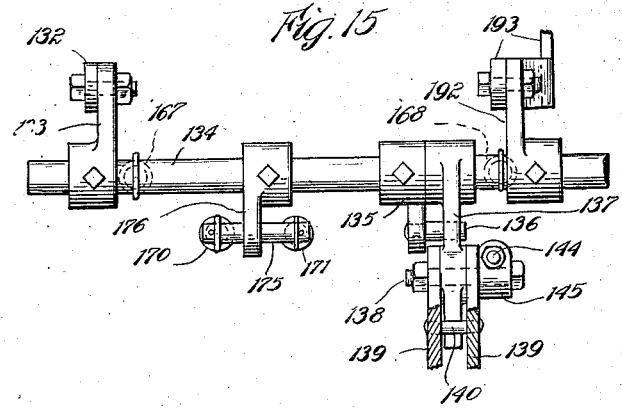
Figure 8:
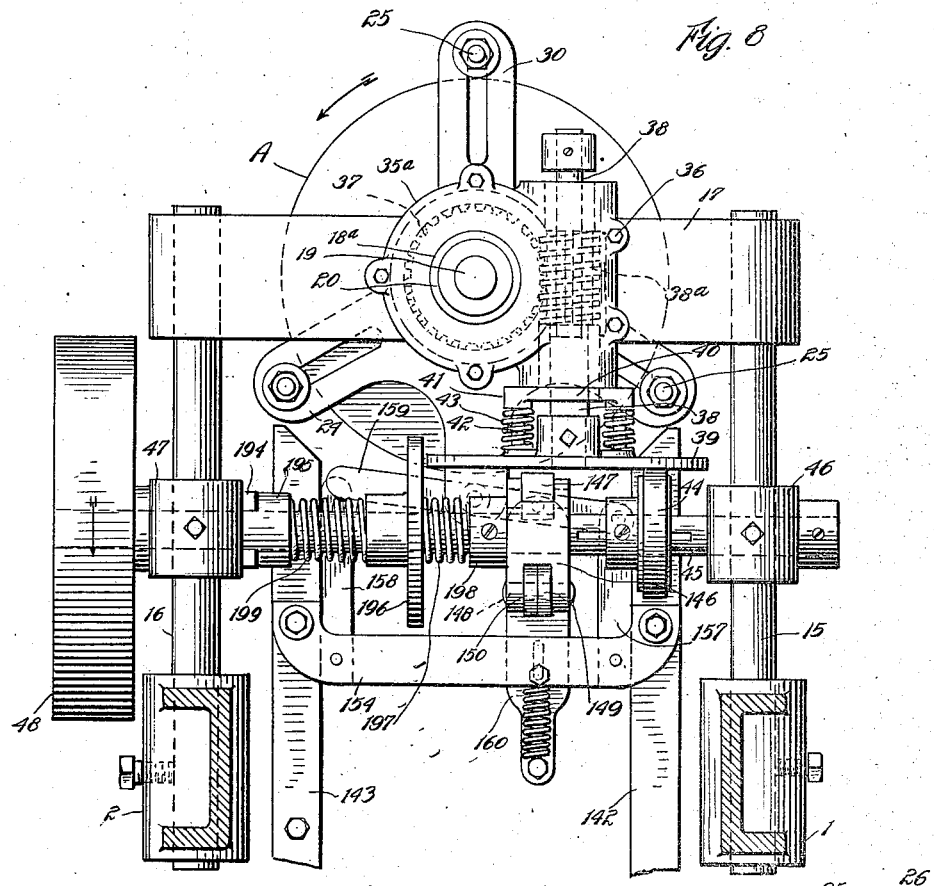
Figure 9:
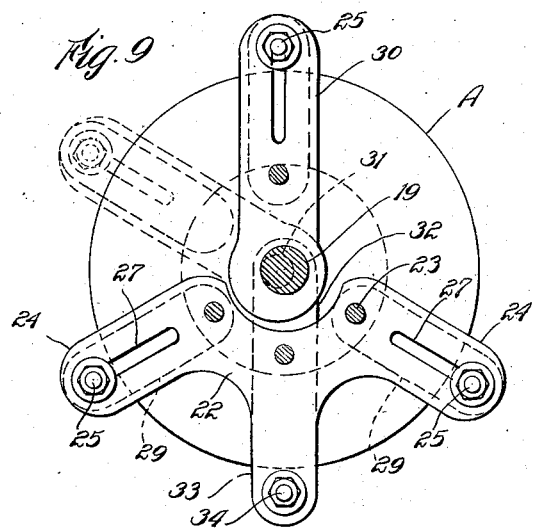
Figure 10:
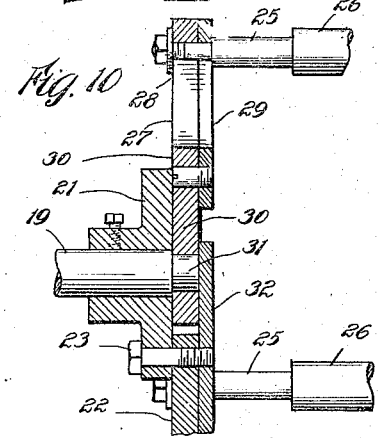

Referring to the drawings, Fig. 1 is a side elevation of the machine with the soldering copper in elevated position. Fig. 2 is a front view of the machine taken at right angles to the axis of rotation of the can holding head. Fig. 3 is a rear elevation of the machine. Fig. 4 is a sectional elevation showing the soldering copper in operative position. Fig. 5 is a fractional side elevation with the near frame member removed, and showing the copper and controlling mechanism in intermediate position. Fig. 6 is a fractional view of the copper controlling mechanism shown in position for the elevation of the copper. Fig. 7 is a detail front view of a portion of the control mechanism. Fig. 8 is a view of the lower end of the can rotating mechanism seen from the axis of the can holder. Fig. 9 is an end view of the can holder, and Fig. 10 is a sectional view of the same. Figs. 11 and 12 are front and side views respectively of the soldering copper and associated operating parts. Figs. 13, 14 and 15 are detailed structural views.

Stated generally, the machine comprises an inclined guide way with a can holding head positioned opposite its lower end and revoluble on an inclined axis. A sliding carriage, mounted on the inclined guide way, supports a soldering copper and devices for feeding solder and flux to the work when in operation. The automatic operating mechanisms are so arranged that an operator, having placed a can body assembled with its end closure or bottom in the holder head, starts the operation of the machine, whereupon the sliding carriage is automatically lowered on its support until the copper is positioned within the can and over the seam to be soldered, the copper being then dropped into contact with the work. Operating mechanism is then automatically set in motion whereby the can is slowly revolved, moving the bottom seam under the hot copper while solder and flux are automatically fed to the latter. At the end of a revolution of the can, the rotating head and solder feeding mechanisms are stopped, the copper is lifted from the work, and the carriage is returned to elevated position, withdrawing the copper and its associated devices from within the can. The machine then rests until the finished can has been replaced and the operation again started.

More specifically described, the operating parts of the machine are illustrated herein as being supported upon a frame comprising a pair of upright side members 1 and 2, rigidly connected by cross members 3, 4 and 5. An inclined slideway is supported above the frame, comprising a pair of parallel guide bars 6 and 7 rigidly secured in corner bosses 8 and 9 formed on the respective side frame members and extending rearwardly upward at approximately forty-five degrees from horizontal. Bearing blocks 10 and 11 are secured on the upper ends of the bars 6 and 7, the blocks being cross connected by a rigidly secured brace bar 12. A pair of supporting braces 13 and 14 extend from the blocks 10 and 11 to the rear corners of the respective side frame members.

Positioned below the lower ends of the guide bars 6 and 7 and at right angles thereto, are a pair of posts 15 and 16 secured in the front legs of the frame members 1 and 2 and longitudinally adjustable therein. Bridging the upper ends of the posts 15 and 16, is a member 17 secured thereto and having central bearings 18 and 18ª in which are journaled a shaft 19 (see Fig. 8) with its axis parallel to the bars 6 and 7, the shaft being endwardly secured by a collar 20. The upper end of the shaft 19 carries a flanged collar 21 secured thereto and supporting a head spider 22 facing the end of the slideway formed by the bars 6 and 7, the spider being rigidly secured to the collar as by bolts 23. Two radial arms 24 of the spider respectively carry one of a pair of studs 25 extending parallel to the axis of the shaft 19 and preferably outwardly covered by a resilient sleeve 26. The studs 25 serve as lateral supports between which is clamped the can being operated upon (illustrated at A) the end of the latter resting upon the spider and centered with the axis of the shaft 19. To accommodate cans of varied diameters, the studs 25 are radially adjustable on the arms 24, the latter having radial slots 27 through which extend the reduced end portions 28 of the studs outwardly threaded with securing nuts. The positions of the studs 25 are determined by interchangeable sets of spacer plates 29, positioned on the upper faces of the spider arms and secured at their inner ends by the bolts 23, the outer ends of the plates having apertures for receiving and radially positioning the end portions 28 of the studs, thereby locating the studs at the required radial distances for the respective sizes of cans. One set of plates is shown in position in the drawings. The position of the can holding head in relation to the guide bars 6 and 7 is further adjustable by varying the positions of the posts 15 and 16 in their frame supports.

A third radial arm 30 is positioned in the same plane with the arms 24, but independent of the latter, the arm 30 being swingably mounted on an eccentric extension 31 of the shaft 19. The arm 30 carries a stud 25 adjustably mounted in a longitudinal slot in the arm and radially positioned by a spacer plate 39, similar to those carried by the arms 24. A retaining plate 32, secured to the spider 22 by one of the bolts 23, extends over the end of the shaft 19 and holds the arm 30 in place thereon. The arm 30 may be swung aside, as illustrated in Fig. 9, to permit the lateral entry of a can between the several studs, and then swung back over the can on its eccentric pivot support, the latter drawing the swinging stud 25 and its sleeve 26 radially inward upon the can and locking it in secured position upon the revolving head.

The spider 22 also includes a central radial arm 33, at the end of which is rigidly secured an elongated stud 34 extending generally parallel to the studs 25. The operative function of the stud 34 will be later described.

The rotation of the spider and its associated parts on the supporting shaft 19, revolves the seam of a can secured therein suitably for the application of the solder by other means later described. The shaft 19 is driven by automatically controlled mechanism next to be described.

The central portion of the bridge member 17 is shaped to form a gear casing 35 about the shaft 19 between its bearings 18 and 18ª, the casing having a separable cover portion 35ª suitably secured to the casing body as by bolts 36. Within the casing 35—35ª is a worm gear 37 (see Fig. 8) rigidly mounted on the shaft 19 and in driven engagement with a worm sleeve 38ª splined on a shaft 38 having its bearings in the casing and extending below the latter, the shaft 38 being longitudinally slidable through its bearings and through the splined worm sleeve 38ª. The lower end of the shaft 38 carries a rigidly secured friction disc 39. Bearing against the lower face of the adjacent shaft bearing is a collar 40 slidably mounted about the shaft 38 and having a pair of lateral wings 41. The latter are provided respectively with bearings in which are slidably disposed the upper ends of a pair of pins 42 fixed in the disc 39, the pins maintaining the collar in constant rotative relation to the disc. A pair of compression springs 43 are confined between the collar 40 and the disc 39, the latter being thereby normally forced downward (with the shaft 38) into driven engagement with a friction driving wheel 44 mounted on a drive shaft 45. The wheel 44 is preferably adjustable longitudinally on the shaft 45 so as to vary its distance from the axis of the disc 39 and thereby vary the speed of the driving train for the rotating can-holding head. The disc 39 may be lifted out of engagement with the constantly driven wheel 44, as hereinafter described, to stop the rotation of the can holder. The drive shaft 45 is journalled in bearing blocks 46 and 47 secured to the posts 15 and 16 respectively, and is driven by a pulley 48.

The soldering copper, and the flux and solder feed devices are supported on a sliding carriage operatively mounted on the inclined guide bars 6 and 7. The carriage comprises a pair of transversely positioned spaced support bars 49 and 50 having their ends rigidly secured in two pairs of slide blocks 51 and 52 slidably mounted on the bars 6 and 7. A pair of adjustable collars 53 secured on the respective bars 6 and 7 limit the downward movement of the blocks 52 and the carriage. A pair of brackets 54 and 55 secured on the support bars 49 and 50 extends downwardly and rigidly supports a longitudinally extending supporting arm 56, the latter being adapted to carry the copper, flux and solder feed into the interior of the can to be operated upon.

A container 57 is secured to the preferably laterally flattened lower portion of the bar 56, adapted to carry a supply of liquid flux. The lower end of the container carries a horizontal plate 58 (see Figs. 11 and 12) extending laterally and forming a flange beneath which is positioned a yoke shaped bracket 59 with its arms extending downward. The bracket 59 is pivoted on a vertical axis, being supported by a pivot bolt 60 from the flange portion of the plate 58. A horizontal cross pin 61 is mounted in the lower ends of the spaced arms of the bracket 59. A pair of spaced plates 62 are pivoted at one end respectively on the pin 61, and extend laterally from the bracket 59. Between the plates 62 is positioned a soldering copper 63 having its lower extended end suitably shaped to engage and spread solder upon the angular bottom joint of a can revolved beneath it. The copper is heated by a pair of flat electric heating elements 64, of well known construction, placed laterally of the respective sides of the copper between it and the plates 62. The elements may be protected by thin metal sheaths 65 extending between the elements respectively and the sides of the copper, with their margins bent over the upper and lower edges of the plates 62. The copper and heating elements are rigidly clamped and supported between the plates 62 by means of bolts 66 connecting the laterally extended ends of the plates. Electric current is delivered to the heating elements by means of suitable conductors as illustrated at 67 leading to a source of supply.

It will here be observed that the soldering copper is supported for universal movement, permitting the wedge shaped lower end of the copper to adjust itself exactly to the position of the bottom seam of the can with which it is in working contact, as the can is rotated in the holding head. It will be noted also that the angular position of the can forms a valley of the inclined can walls adjacent the seam, thus confining the flow of melted solder fed in uniform quantity to be desired limits of spread about the seam.

The copper is lowered and raised from contact with the work by means of a small chain 68 connected to the free end of one of the plates 62, as by one of the bolts 66, and attached at its upper end to a pivoted sector 69 the latter being supported on a pivot pin 70 journalled in a bearing strap 71 secured to the container 57. The sector 69 is operated by a rod 72 pivotally connected thereto and extending upwardly to the sliding carriage. The upper end of the rod 72 passes through a swinging cross rod 73 and is adjustably connected thereto as by means of a thumb nut 74. The cross rod 73 is laterally carried by a pair swinging plates 75 loosely mounted on the carriage support bar 49. The ends of the cross rod 73 extend through the plates 75 and into engagement with another pair of plates 76 positioned laterally outward of the plates 75 and fixed to the slide blocks 51, as by screws 77. (See Fig. 13.) The cross rod 73 engages the plates 76 within slots 78 which limit the swinging movement of the rod 73, after effecting the raising or lowering of the soldering copper. The swinging rod 73 is actuated by means hereinafter described.

Wire solder is fed to the working end of the soldering copper through a tube 79 extending longitudinally of the bar 56 to the sliding carriage. The lower portion of the tube 79 communicates with the flux container 57 through a connecting tube 80 positioned in the lower portion of the container and extending outward beneath the tube 79 to which it is attached and interiorly connected by an aperture through the respective adjacent tube walls. Holes 81 in the tube 80 within the container 57 admit a limited amount of flux to the connecting tube and thence to the solder feed tube 79, the flux flowing down through the latter to a tubular wick 82 of suitable flexible material and saturating the latter. The wick 82 is mounted about the end portion of the tube 79, and is positioned for contact with the seam being soldered to apply the flux thereto in advance of the application of the hot copper as the can is rotated. The wire solder, fed down through the tube 79 and the tubular wick 82, is bathed with the flux as it is fed into contact with the hot copper.

The upper portion of the solder feeding tube 79 terminates adjacent a pair of solder feeding rolls 83 and 84, (see Fig. 12) from which the solder is propelled into and through the tube 79 to the work, the solder being indicated at 85 and preferably drawn from a spool (not shown) suspended above the machine. The rolls 83 and 84 may be provided with interengaging teeth for their uniform operation, and both are provided with registering grooves, preferably serrated, which engage the wire solder between the rolls and indent the solder as it is propelled to the tube 79, the identations serving to assist in carrying flux with the solder to the hot copper. The lower feed roll 84 is idly rotatable on a stub shaft 86 secured in the lower end of a bearing bracket 87 centrally mounted on the bar 56 between the carriage members 49 and 50. The upper feed roll 83 is rigidly mounted on a drive shaft 88 having an outbearing in the upper end of the bracket 87 and passing through a divided casing 89—89$^a$ with bearings in its lateral walls for the shaft 88.

Within the casing 89—89$^a$ is a worm gear 90 (Fig. 12) rigidly mounted on the shaft 88 and in driven engagement with a worm sleeve 91 splined on a shaft 92 having its bearings in the casing and extending below the latter, the shaft 92 being longitudinally slidable through its bearings and through the splined worm sleeve 91. The lower end of the shaft 92 carries a rigidly secured friction disc 93. Means is provided for resiliently forcing downward the disc 93 with its shaft 88, similar in construction to that described in connection with the disc 39, and here comprises a laterally winged loose collar 94 bearing against the underside of the casing 89 and slidably engaging a pair of pins rigidly set in the disc 93, and confining between it and the disc a pair of compression springs of which one is illustrated at 95 in Fig. 12.

When the sliding carriage is in lowermost position the disc 93 overlies a friction driving wheel 96 with which the compression springs 95 tend to maintain the disc 93 in driven engagement. The wheel 96 is mounted on a drive shaft 97 journalled in a pair of bearing brackets 98 extending upward from the respective side frame members 1 and 2. The shaft 97 carries two pulleys, an outer one 99 adapted for a belt drive from a source of power, and an inner pulley 100 arranged for a belt connection with the pulley 48 on the lower drive shaft 45 for driving the latter.

The sliding carriage on which is supported the soldering copper and associated parts is moved on the guide bars 6 and 7 by means of a pair of chain belts 101 and 102, operatively supported near the lower ends of the guide bars by a pair of idler sprockets 103 and 104 rotatable on a pair of stub shafts mounted in the respective side frame members 1 and 2. At the upper ends of the guide bars, the chains are supported on a pair of sprockets 105 and 106 secured upon a shaft 107 journaled in the bearing blocks 10 and 11. The upper runs of the chain belts are positioned laterally inward of the respective guide bars and pass beneath the lateral ends of the sliding carriage.

Each of the chains 101 and 102 carries a similarly located inwardly extending lug 108. When the upper runs of the chains are driven upwardly, the lugs 108 engage the respectively adjacent swinging plates 75 suspended from the carriage, and carry the latter forward to the limit of the movement of the rod 73 in the slots 78 in the rigidly secured plates 76, the continued upward movement of the chains carrying the carriage upward on the guide bars 6 and 7. With the carriage in lowermost position, the lugs 108 are out of contact with the plates 75, and the latter are free to swing downwardly with the parts previously described for raising and lowering the soldering copper on the work, thus releasing the copper for working contact with the can seam.

Upon the withdrawal of the copper from the can after completion of the work, by the upward movement of the carriage, the first operative result of the engagement of the carriage elevating chains is to swing upwardly the plates 75 and thereby effect the lifting of the soldering copper so that it will pass freely out of the can without contact in the passage. The reverse movement of the chains 101 and 102 permits the downward movement of the carriage to carry the soldering copper into a can at the beginning of the soldering operation, the carriage sliding down by gravity and held in check by the engagement of the lugs 108 with the plates 75, the copper being thus held in raised position. When the carriage comes to rest in abutment with the collars 53, the lugs pass out of engagement with the swinging plates and the copper is lowered into operative contact with the work.

When the carriage reaches its uppermost position, the driving mechanism for the chains is automatically disengaged, as later described, and the chains are held against reverse movement under the weight of the supported carriage by means of a pair of specially formed links 109 in the respective chains (see Fig. 1), having portions projecting substantially above the normal surfaces of the chains. At the end of the upward movement, the links 109 have just passed under a pair of spring clips 110 overlying the sprockets 105 and 106 and resiliently supported on the brace bar 12 by means of positioning bolts 111 loosely engaging the clips and carrying compression springs 112 bearing upon the respective clips. With the disengagement of the chain driving mechanism the links 109 are engaged beneath the clips 110, the tension of the latter being sufficient only to prevent reverse movement of the chains until the chain driving mechanism is reengaged and the chains are positively driven in reverse direction.

It will be noted also that the friction disc 93 is carried free from its driving wheel 96, with the upward movement of the carriage. The friction disc and wheel for driving the solder feed rolls are in operative relation only when the carriage is in lowermost position.

The operating mechanism for the chain belts is in driving connection with the chain 102 only, the other chain being driven in synchronism through the shaft 107. The lower run of the chain 101 is further supported by an idler sprocket 113 mounted on a stub shaft carried by a bracket 114 secured to the cross frame member 3 adjacent the side member 1. Mounted also on the frame member 3 is a rocking bracket sleeve 115 operable between the two fixed positioning collars 116 and 117. The end of the sleeve 115 adjacent the chain 102 carries a pair of angularly related arms 118 and 119 (see Figs. 6 and 14) in which are mounted a pair of stub shafts 120 and 121. A pair of intermeshing gears 122 and 123 are operatively mounted on the respective stub shafts, the gear 123 carrying an axially alined sprocket 124 in rigid relation thereto, the sprocket 124 being in driving engagement with the chain 102. A driving gear 125 is mounted on the drive shaft 97 in position for engagement with either of the gears 122 and 123, such engagement being effected selectively by swinging the rocking bracket 115.

It will here be observed that with the drive shaft 97 rotating counter clockwise and with the gears 125 and 123 in mesh (as illustrated in Fig. 6) the chain 102 will be operated in the direction to elevate the sliding carriage supporting the soldering copper. With the rocker bracket oppositely positioned, the gear 122 engages the driving gear 125, and the gear 123 with its attached sprocket 124 is reversely rotated to operate the chain 102 in the direction to lower the carriage. With the rocker bracket 115 in centered position, both gears 122 and 123 are disengaged from the constantly driven gear 125, and the carriage operating mechanism is at rest.

The movement of the rocking bracket 115 into the selective positions just enumerated, is accomplished in part by a depending crank arm 126, preferably integral with the bracket 115. One end of a tension spring 127 is attached to a pin mounted in the lower end of the arm 126, and extending longitudinally from the arm to a cross bar 128 secured between the side members of the frame, the other end of the spring 127 being secured to the bar. The normal action of the spring 127 is to swing the bracket 115 into neutral position with both the gears 122 and 123 disengaged from the driving gear 125.

Assuming the carriage to be in uppermost position with the machine at rest, the chain operating mechanism is started and the lowering of the carriage is begun by depressing a pedal 129 pivotally supported on a shaft 130 journaled in brackets 131 mounted on the frame cross members 4 and 5. An upright bar 132, pivotally attached to the pedal 129 at its lower end, is pivotally connected to a rocker arm 133 rigidly mounted on a rocker shaft 134 journaled in the respective side frame members 1 and 2. Another rocker arm 135, (see Fig. 15) rigidly mounted on the shaft 134, carries a fixed pin 136 extending beneath a toggle member 137 loosely mounted on the shaft 134. The member 137 is operatively connected by a pivot bolt 138 between a pair of toggle members 139 having their opposite ends pivotally connected to the crank arm 126. The members 139 carry a cross pin 140 positioned for engagement by the extended end of the toggle member 137, and constituting a stop for the alining movement of the toggle members. With the depression of the pedal 129, the toggle members are raised by the pin 136 and set, forcing outward the crank arm 126 into the position illustrated in Fig. 5, thereby swinging the gear 122 into engagement with the driving gear 125 and driving the chains 101 and 102 with their upper runs travelling downward. When the carriage has reached its position of abutment with the collars 53, the chains are continued in operation for a short period, withdrawing the lugs 108 from the copper elevating devices.

The carriage lowering operation of the chains is stopped by the engagement of a second pair of lugs 141, mounted on the respective chains 101 and 102 spaced below the lugs 108, with the upper free ends of a pair of swinging bars 142 and 143 laterally adjacent the chains and pivoted at their lower ends on the cross bar 128. A headed rod 144 passes loosely through the mid portion of the bar 143 and is secured at its upper end in a collar 145 mounted on the toggle pivot bolt 138. As the bars 142 and 143 are swung down by the lugs 141 the bar 143 engages the head of the bolt 144 and draws the latter downward breaking the toggle, whereupon the spring 127 draws the arm 126 into neutral position and disengages the chain driving gears from the drive gear 125. The chains and carriage remain thus at rest during the soldering operation.

The mechanisms for rotating the can holding head and for feeding the solder are started in operation by the downward swing of the bars 142 and 143 coincidently with the stoppage of the chains. On the drive shaft 45, carrying the friction driving wheel for operating the can rotating mechanism, is mounted a rocker member 146 positioned beneath the friction disc 39 and having a central loose bearing on the shaft. The bifurcated upper arm of the member 146 carries a pivoted roller 147. With the rocker member 146 in upright position, the roller supports the disc 39 in elevated position free from the constantly driven friction wheel 44, and prevents operation of the can rotating mechanism.

The lower bifurcated arm of the rocker member 146 carries a cross pin 148 upon which are supported the lower ends of a pair of control bars 149 and 150. The control bar 150 is pivoted on the pin 148, and by the longitudinal movement of the bar the rocker member 146 is swung into position to lift the disc 39 out of engagement with its driving wheel, or is swung into position to disengage the roller 147 from the disc 39 and permit the latter to drop into driven engagement with the wheel 44. The other control bar 149 engages the pin 148 in a longitudinal slot by which the bar is supported for free movement relative to the pin.

The other drive shaft 97, carrying the friction drive wheel 96 for operating the solder feed rolls, also carries a loosely bearing rocker member 151, similar to the member 146, and having a roller 152 operable to effect engagement or disengagement between the friction disc 93 and its driving wheel 96. A cross pin 153, carried by the lower arm of the member 151, is pivotally connected with the upper end of the control bar 149 by which the rocker member 151 is operated. The bar 150 is provided at its upper end with a longitudinal slot engaging the pin 153 and permitting free relative movement between the latter bar and the pin. It will here be observed that by their alternately slotted connections with the respective rocker member supporting pins, the bars 149 and 150 are independently operable to control the respective driving mechanisms at different time periods.

The control bars 149 and 150 pass between the swinging bars 142 and 143, on which latter is supported a device for operating the control bars. Bridging the upper portions of the bars 142 and 143, is a frame member 154 having upturned ends bearing on the respective bars 142 and 143 and secured thereto by bolts 155 mounted in the latter bars and extending loosely through the end portions of the member 154, the outstanding bolt heads confining compression springs 156 bearing upon the outer face of the member 154. The securing means last described, permits the frame member 154 to swing resistingly from the bars 142 and 143, bearing on its upturned ends as a fulcrum.

A pair of upright supports 157 and 158 are rigidly secured to the member 154, extending upwardly alongside the bars 142 and 143 respectively. A lever 159 is pivoted on the upper end of the support 157, and extends across into sliding engagement with the opposite support 158. A latch plate 160, pivoted at its upper end to the lever 159 by a pin 161, extends downwardly across the member 154, to which it is slidably secured by a bolt 162 engaging a longitudinal slot in the latch plate, the latter being movable up and down by the lever 159. A tension spring 163, oppositely secured to the bolt 162 and to a pin 164 fixed in the extended lower end of the latch 160, tends to elevate the latch plate and lever 159 to the limit of the slot engaging the bolt 162.

The latch 160 has a central aperture 165 through which pass the control bars 149 and 150, the latter being provided with normally registering notches 166 which are positioned for engagement upon the lower margin of the latch aperture 165. The engaging margin of the latch aperture is preferably stepped, that portion beneath the bar 149 being lower than that beneath the bar 150.

The swinging bars 142 and 143, with the latch device supported thereon, are held normally in upper position by a pair of tension springs 167 and 168, attached to the respective bars and to the rock shaft 134, the upward swing of the bars being limited by a pair of stop pins 169 secured in the side frame members 1 and 2. Likewise, the control bars 149 and 150 are held normally in upper positions by a pair of tension springs 170 and 171, respectively secured at their lower ends to a pair of depending plates 172 and 173 fixed on the outer sides of the respective control bars and adapted to upwardly abut a stop bar 174, secured to the side frame members and limiting the upward movement of the control bars. The upper ends of the springs 170 and 171 are secured to a cross pin 175 carried by a rocker arm 176 rigidly mounted on the rock shaft 134. The springs 170 and 171 thus serve both to retain the control bars normally in upper positions, and to retain the rock shaft 134 with its attached rocker arms in normal position with the pedal 129 elevated against the stop bar 177 secured in the lower flange of the frame member 1.

With both the swinging bars 142 and 143, and the control bars 149 and 150, in their respective normal upper positions, the latch 160 is engaged in both of the notches 166 in the control bars. When the descending lugs 141 on the chains engage the bars 142 and 143 and move the latter downward, the latch 160 carried thereby forces the control bars downward, swinging the respective rocker members 146 and 151 into position to release the friction discs 39 and 93 into operative engagement with their driving wheels, and the soldering operation is started as previously described.

The swinging bars and control bars are retained in lowered positioned by the stoppage of the chains, as previously described, with the lugs 141 in engagement with the bars 142 and 143, and during a period in which the soldering operation is completed. The tension of the several springs attached to the control bars and the swinging bars is such that their aggregate counter force applied to the lugs 141 is not sufficient to overcome the friction in the chains and their supporting sprockets and driving gears, thus preventing the chains from moving in reverse direction when the driving gears are in neutral position. Also, the downward movement of the lugs 141 is arrested by the disengagement of the chain driving gears just as the lugs are passing over the sprockets 103 and 104, the latter serving as a stop for the lugs against the return movement of the swinging bars.

As the latch supporting frame is moved downward against the control bars by the bars 142 and 143, it remains in normal relation to the latter by reason of the control bar engaging margin of the latch aperture being slightly below the line of the fulcrum-forming ends of the cross member 154. The lever 159 is designed to be depressed from its normal upper position, at the completion of a revolution of the can holding head during which the soldering operation is done, by the stud 34 carried by the rotating head spider 22. When at rest, the normal position of the stud 34 is at lower center, directly in the path of the raised lever 159 as the latter swings downward. Upon lateral engagement of the lever with the end of the stud 34, the latch frame resistantly tips on the fulcrum ends of its lower member 154 as illustrated in Fig. 4, thus permitting the bars 142 and 143 to pass sufficiently further down so that when the stud 34 passes out of its lateral engagement with the lever 159 by the rotation of the can holding head, and the the latch frame thereupon snaps back into normal relation to the swing bars, then the lever 159 is positioned for engagement upon its upper edge by the stud 34 at the completion of a revolution of the can holding head.

As the soldering operation nears completion and the stud 34 approaches its normal position of rest after a revolution of the can holding head, the stud 34 engages from above and gradually depresses the lever 159, thereby moving the latch 160 slowly downward and out of engagement with the notches 166 in the control bars. The control bar 149 is first released from its lower portion of the engaging margin of the latch aperture, the spring 170 thereupon moving the bar upwardly and operating the rocker member 151 into position to disengage the solder feed roll driving disc 93 from its driving wheel 96, and thus discontinuing the supply of solder to the soldering copper over an overlapped portion of the soldering operation later described.

The further depression of the lever 159 releases the other control bar 150 as the stud 34 reaches its normal position of rest, whereupon the spring 171 moves the bar 150 upward and swings the rocker member 146 into position to disengage the disc 39 from its driving wheel and stop the operation of the can holding head.

The upward movement of the control bar 150 is also effective to cause the engagement of the chain driving gears for the reverse movement of the chains to elevate the carriage supporting the soldering copper and withdraw the latter from the finished can. The rocker sleeve 115, which carries the chain driving gears, is also provided with a rigidly related bracket arm 178 (see Figs. 6 and 14) carrying a pivot pin 179 upon which is operatively mounted a dog 180 having a laterally turned portion 181 extending beneath the upper portion of the control bar 150. The portion 181 normally is maintained in contact with the underside of the bar 150 by a tension spring 182 secured to a pin 183 fixed in the arm 178 and to the inturned end of a bar 184 pivotally connected to the dog 180.

The bar 150 is provided with a notch 185 positioned for engagement by the dog 180 when the bar is released from the latch 160 and moves upwardly, whereby the rocker sleeve is operated to throw the gear 123 into mesh with the driving gear 125 and thereby start the operation of the chains 101 and 102 in the direction to elevate the copper supporting carriage. At the same time the swinging bars 142 and 143 are released to return to their normal upper positions.

The elevating operation of the chains is continued until the carriage reaches the top of the guide bars 6 and 7, at which position a pair of projecting studs 186, rigidly mounted in the carriage slide blocks 51, engage the extended ends of a cross bar 187 carried at the upper ends of a pair of levers 188 having central free bearings on the shaft 107. Another cross bar 189 is pivotally supported in the lower ends of the levers 188, to which the bar 184 is connected, as by the strap 190. Upon the engagement of the studs 186 with the bar 187, the bar 184 is moved longitudinally downward, swinging the dog 180 to release the latter from the control bar 150, and further moving the dog 180 against a pin 191 fixed in the bracket arm 178, thereby operating the rocker sleeve 115 to disengage the gear 123 from the driving gear 125. The spring 127 then functions to swing the chain driving gears into neutral position, with all of the mechanism at rest, awaiting the replacement of the finished can and the starting of repeated operation by depression of the pedal 129.

The operative arrangement of the machine further provides for the reverse rotation of the can being soldered for a short distance, before the soldering copper is lowered into contact with the work. This permits overlapping the beginning and ending of the soldering operation and assures a continuously smooth finished seam. The reverse rotation occurs with the depression of the pedal 129 in starting the operation of the machine, through a rocker arm 192 rigidly mounted on the rock shaft 134. A bar 193, pivotally connected at its upper end to the arm 192, extends downwardly to the can rotating drive shaft 45 and terminates in a yoke 194 having longitudinally tapered arms embracing the shaft adjacent the bearing block 47. A tapered collar 195 is loosely mounted on the shaft 45, having tongue portions extending between the arms of the yoke 194. A friction disc 196 is keyed on the shaft 45 for longitudinally slidable movement into contact with the lateral edge of the disc 39 upon the side of the latter opposite from the position of the driving wheel 44. A compression spring 197, positioned on the shaft 45 between the disc 196 and a rigidly mounted collar 198, normally holds the disc 196 out of engagement with the disc 39. A stiff spring 199 is positioned on the shaft between the disc 196 and the tapered collar 195.

With the depression of the pedal 129, the tapered yoke arms of the bar 193 force the collar 195 inward upon the stiff spring 199 which carries the disc 195 resiliently into engagement with the edge of the disc 39, and rotates the latter reversely to its normal direction of rotation by the wheel 44. In this reverse movement of the can holding head, the stud 34 does not pass out of the path of lateral movement of the lever 159, so that when the latter is swung into engagement with the stud, the end of the stud abuts the lateral surface of the lever. The momentary engagement of the disc 196, only during the period of depression of the pedal 129, moves the can to be soldered a short distance back of the position where it will finally come to rest after the normal rotation of the can during the soldering operation, and thus provides for the overlapping travel of the soldering copper over the can seam.

We claim as our invention:

1. A soldering machine comprising a rotatable head for holding a can having an annular seam, a heated soldering copper, a slidable carriage supporting said copper adapted to move said copper in and out of said can and into contact with said seam, means for actuating said carriage, means operable to rotate said head, and automatic means for effecting the operation of said head rotating means when said copper is in contact with said seam.

2. A soldering machine comprising a rotatable head for holding a can having an annular seam, a heated soldering copper, a slidable carriage supporting said copper adapted to move said copper in and out of said can and into contact with said seam, solder feeding means mounted on said carriage, means for actuating said carriage, and automatic means for causing said solder feeding means to operate when said copper is positioned in contact with said seam.

3. A soldering machine comprising a rotatable head for holding a can having an annular seam, a heated soldering copper, means for moving said copper into and out of contact with said seam, means for reversely rotating said head from a determined starting position, and means for rotating said head in normal direction through a complete revolution from said starting position.

4. A soldering machine comprising a rotatable head for holding a can having an annular seam, a heated soldering copper, a slidable carriage supporting said copper adapted to move said copper in and out of said can, said copper being movable in relation to said carriage, means for actuating said carriage, means for moving said copper into contact with said seam when said copper is within said can, means for rotating said head, and means for automatically starting said head rotating means when said copper is moved into contact with said seam.

5. A soldering machine comprising a rotatable head for holding a can having an annular seam, a heated soldering copper, a reciprocatory carriage supporting said copper, intermittently operable means for actuating said carriage in one direction to move said copper into position for contact with said can seam and in opposite direction to withdraw said copper from said can, intermittently operable means for rotating said head, means operable by said carriage actuating means for arresting said actuating means and starting said head rotating means when said copper is positioned in contact with said seam, and means operable by said rotatable head for arresting said head rotating means and starting said carriage actuating means in reverse operation when said head has completed a revolution.

6. A soldering machine comprising a rotatable head for holding a can having an annular seam, a heated soldering copper, a reciprocatory carriage supporting said copper, means for feeding solder to said copper, intermittently operable means for actuating said carriage in one direction to move said copper into position for contact with said can seam and in opposite direction to withdraw said copper from said can, intermittently operable means for rotating said head, means operable by said carriage actuating means for arresting said actuating means and starting said can rotating means and said solder feeding means when said copper is positioned in contact with said seam, and means operable by said rotating head for arresting said head rotating means and said solder feeding means and starting said carriage actuating means in reverse operation when said head has completed a revolution.

7. A soldering machine comprising a rotatable head for holding a can having an annular seam, a heated soldering copper, a reciprocatory carriage supporting said copper, intermittently operable means for actuating said carriage in one direction to move said copper into position for contact with said can seam and in opposite direction to withdraw said copper from said can, intermittently operable means for rotating said head, means operable by said carriage actuating means for arresting said actuating means and starting said head rotating means when said copper is positioned in contact with said seam, means operable by said rotatable head for arresting said head rotating means and starting said carriage actuating means in reverse operation when said head has completed a revolution, and means operable by said reciprocatory carriage for finally arresting said carriage actuating means when said copper has been withdrawn from said can.

8. A soldering machine comprising a head for holding a can body having an end closure and a seam therebetween, said head being rotatable on an inclined axis and receiving said can body with its end closure downwardly positioned, a heated soldering copper, a reciprocatory carriage supporting said copper and operable to move said copper to and from position for contact with the lowermost portion of said can seam, means for actuating said carriage, means for rotating said head, and means controlled by said carriage actuating means for causing said head rotating means to operate when said copper is in contact with said seam.

9. A soldering machine comprising a head for holding a can body having an end closure and a seam therebetween, said head being rotatable on an inclined axis and receiving said can body with its end closure downwardly positioned, a heated soldering copper, a reciprocatory carriage supporting said copper and operable to move said copper to and from position for inward contact with the lowermost portion of said can seam, means on said carriage for feeding solder to said copper, means for actuating said carriage, means for operating said solder feeding means when said copper is in contact with said seam, and means for rotating said head when said copper is in such contact.

10. In a soldering machine, rotatable means for securing a can to be soldered, comprising a rotatable shaft, a pair of radially disposed arms rigidly mounted on said shaft, a stud on each of said arms positioned to jointly support one side of a can body placed thereon in axial alinement with said shaft, a swingable radial arm having a pivoted support in eccentric relation to the axis of said shaft, a stud on said swingable arm extending oppositely of said rigidly supported studs, said swingable arm being movable in one lateral direction to permit the emplacement of a can between said studs, and being reversely swingable to lock said can therebetween by the eccentric movement of said movable stud in decreasing radial distance from said shaft.

11. In a soldering machine, an adjustable head for rotatably supporting a can to be soldered, comprising a rotatable shaft, a plurality of radially extending arms mounted on said shaft, said arms having radial slots, a stud mounted on each of said arms having a portion slidably positioned in its respective slot, a positioning pin fixed in each of said arms, and a plurality of sets of detachable plates, the several plates of each set being mountable on said arms respectively in engagement with said positioning pins and having apertures to receive said studs and position them concentrically at a selected radial distance from the axis of said shaft.

12. In a soldering machine a rotatable head for supporting a can to be soldered, a soldering copper, means for moving said copper into contact with said can and means for revolving said head during the period of such contact comprising a rotatable shaft having driving connections with said head, a second shaft having connection with a source of power, a pair of transmission members mounted on said shafts respectively and adapted for selective interengagement, a lever normally engaging one of said members operable to move said member into and out of engagement with the other of said members, and operative connections between said lever and said copper moving means whereby said lever is operated to cause the interengagement of said transmission members when said copper is in contact with said can.

13. In a soldering machine, a rotatable can-holding head, and means for selectively rotating said head in opposite directions comprising, a rotatable shaft having driving connections with said head, said shaft being longitudinally movable, a friction disc mounted on said shaft, a second shaft having connection with a source of power, a friction wheel on said second shaft positioned for engagement by said disc at one side of the axis of said disc, resilient means tending to maintain said disc in such engagement, a rocker lever loosely pivoted on said second shaft, said lever being operable to engage said disc and move it out of engagement with said wheel, a second disc slidably mounted on said second shaft and extending laterally of said first disc oppositely from the position of said friction wheel, said second disc being normally spaced from said first disc, and means for moving said second disc into engagement with the lateral edge of said first disc.

14. In a soldering machine, means for rotatably supporting an inclined can body having an end closure and a seam therebetween, an arm supported for movement into said can body adjacent said seam, a bracket pivoted to said arm on a vertical axis, a soldering copper pivotally supported on said bracket on a horizontal axis and extending laterally therefrom, and operative supporting means for the free end of said copper adapted to lower said copper into contact with said seam and raise said copper out of such contact.

15. In a soldering machine, means for rotatably supporting an inclined can body having an end closure and a seam therebetween, a slidable carriage, an arm supported on said carriage and movable thereby into position adjacent said seam, a soldering copper supported on said arm, said copper being vertically and laterally swingable, a lever pivoted on said carriage having operative connection with said copper, and means normally maintaining said lever in position whereby said copper is held in raised position, said means operating to release said lever and lower said copper when said arm is positioned adjacent said seam.

16. In a soldering machine, means for rotatably supporting a can body having an annular seam, a slidable carriage, an arm on said carriage movable into said can adjacent said seam, a soldering copper supported on said arm for contact with said seam, solder feeding means mounted on said carriage, and a tube extending from said feeding means to said copper adapted to receive solder and conduct it to the place of contact between said copper and said seam.

17. In a soldering machine, means for rotatably supporting a can body having an annular seam, a movable carriage, an arm on said carriage for movement into said can adjacent said seam, a soldering copper supported on said arm for contact with said seam, a tube adapted to conduct solder from said feeding means to said copper, a receptacle adapted to contain flux and having a connection with said tube for the flow of flux thereinto, and a wick secured to the end of said tube and positioned to wipe said seam in advance of said copper, said solder passing through said wick to said copper.

18. In a soldering machine, means for rotatably supporting a can body having an annular seam, a stationary support, a carriage slidable on said support, an arm mounted on said carriage and movable thereby into proximity to said seam, a soldering copper supported on said arm for contact with said seam, a pair of solder feeding rolls journaled on said carriage adapted to feed solder to said copper, power transmission mechanism mounted on said carriage for rotating said rolls, a stationarily positioned drive shaft, and a transmission member on said drive shaft positioned for engagement with said transmission mechanism when said slidable carriage is in position for contact by said copper with said seam.

19. In a soldering machine, means for rotatably supporting a can body having an annular seam, a soldering copper, a reciprocatory carriage supporting said copper and adapted to move said copper to and from position for contact with said seam, a pair of solder feeding rolls on said carriage adapted to feed solder to said copper, a longitudinally movable shaft on said carriage having driving connections with said rolls, a friction disc carried by said shaft, a stationarily positioned drive shaft, a friction wheel mounted on said drive shaft positioned for engagement by said disc when said carriage is in position for contact by said copper with said seam, resilient means tending to maintain said disc in engagement with said wheel, and a rocker lever loosely mounted on said drive shaft operable to engage said disc and move it out of engagement with said wheel.

20. In a soldering machine, means for rotatably supporting an inclined can body having an annular bottom seam, a pair of inclined bars forming a slideway substantially parallel to the axis of said can body, a carriage slidably mounted on said bars having an arm adapted to enter said can with the movement of said carriage, a stop limiting the movement of said carriage toward said can, a soldering copper swingably supported on said arm, a lever pivoted on said carriage having an operative connection with said copper, said lever having a limited movement in relation to said carriage, a belt operatively positioned adjacent the path of said carriage, and a projecting member on said belt positioned for operative engagement with said lever to raise said copper and withdraw said carriage with the operation of said belt in one direction, and to lower said carriage and release said copper into contact with said seam with the operation of said belt in opposite direction.

21. In a soldering machine, an inclined support forming a slideway, a can holding device at the lower end of said slideway, a carriage slidably mounted on said slideway, a soldering copper supported on said carriage and movable thereby to and from said can, a chain belt intermittently operable to move said carriage up and down said slideway, a sprocket forming an operative support for said belt, a resiliently secured clip positioned adjacent the path of said belt over said sprocket, and a projecting member secured on said belt in position to engage said clip when said carriage is in upward position and thereby prevent the downward movement by gravitation of said carriage.

22. In a can soldering machine, a device for rotatably supporting a can body, a soldering copper, a reciprocatory carriage adapted to carry said copper to and from contact with said can body, a chain belt for actuating said carriage, a drive shaft, a driving gear on said shaft, a pivoted bracket, a pair of interengaging gears operatively mounted on said bracket and swingable thereby into selective engagement with said driving gear, one of said pair of gears being single and the other having a sprocket in fixed relation thereto in constant engagement with said chain belt, resilient means normally maintaining said bracket in position with said pair of gears disengaged from said driving gear, pedal operative means for swinging said bracket to engage said single gear with said driving gear and thereby actuate said chain belt to move said carriage toward said can body, and automatic means operable by said chain to reverse said pedal operative means and release said single gear from engagement with said driving gear thereby arresting the movement of said chain belt.

23. In a can soldering machine, a device for rotatably supporting a can body, a soldering copper, a reciprocatory carriage adapted to carry said copper to and from contact with said can body, a chain belt for actuating said carriage, a drive shaft, a driving gear on said shaft, a pivoted bracket, a pair of interengaging gears operatively mounted on said bracket and swingable thereby into selective engagement with said driving gear, one of said pair of gears being single and the other having a sprocket in fixed relation thereto in constant engagement with said chain belt, resilient means normally maintaining said bracket in position with said pair of gears disengaged from said driving gear, automatic means operable by said can rotating device for swinging said bracket to engage said sprocket bearing gear with said driving gear and thereby actuate said chain belt to move said carriage away from said can body, and automatic means operable by said carriage in outward position to release said first automatic means and disengage said sprocket-bearing gear from said driving gear thereby arresting the movement of said chain belt.

24. In a can soldering machine, a rotatable can holding device, a soldering copper, a slidable carriage adapted to move said copper inwardly and outwardly of operating position, a chain belt for actuating said carriage, a driving gear, a movable bracket having a resiliently maintained normal position, a pair of intermeshing gears operatively mounted on said bracket and selectively engageable with said driving gear by opposite movements of said bracket from normal position, one of said pair of gears having a constant connection for the actuation of said chain belt and the other of said pair being an intermediate gear, toggle means operable to move said bracket, pedal operable means for setting said toggle and causing engagement of said intermediate gear with said driving gear thereby actuating said chain to move said carriage inwardly, a pivoted lever having a connection with said toggle, and an element on said chain adapted to move said lever and break said toggle thereby releasing said intermediate gear from driven engagement and arresting the movement of said chain.

25. In a can soldering machine, a rotatable can holding head, a soldering copper, a slidable carriage adapted to move said copper inwardly and outwardly of operating position, a chain belt for actuating said carriage, a driving gear, a movable bracket having a resiliently maintained normal position, a gear operatively mounted on said bracket selectively engageable with said driving gear by movement of said bracket from normal position and having a constant connection with said belt, a pivoted dog on said bracket, a longitudinally movable bar resiliently impelled to engage said dog and move said bracket from normal position, latch means normally engaging and withholding said bar, a stud carried by said rotatable head operable to disengage said latch means and release said bar whereby said gears are caused to be engaged and said chain belt is actuated to move said carriage outwardly, a pivoted lever engageable by said carriage in outward position, and a connection between said lever and said dog operable to release said dog from said bar and restore said bracket to normal position thereby disengaging said gears and arresting the movement of said chain belt.

26. In a can soldering machine, a rotatable can-holding head, a soldering copper, a slidable carriage adapted to move said copper inwardly and outwardly of operating position, a belt intermittently operable to move said carriage from outward to inward position and from inward to outward position, a drive shaft having a transmission member mounted thereon, actuating mechanism for said rotatable head having a driven member in releasable engagement with said transmission member, a rocker element operable to disengage said driven member, a longitudinally movable bar having operative connection with said rocker element and resiliently impelled to move said element into position to disengage said driven member, a pivoted lever, latch means carried by said lever adapted to engage said bar, means on said belt operable when said carriage is in inward position to move said lever and latch and thereby move said bar and rocker element to cause engagement of said driven member with said transmission member, and means operable by a revolution of said holding head to release said latch means from said bar and cause the disengagement of said driven member.

27. In a can soldering machine, a rotatable can-holding head, a soldering copper, a slidable carriage adapted to move said copper inwardly and outwardly of operating position, a belt intermittently operable to move said carriage from outward to inward position and from inward to outward position, means for feeding solder to said copper, a drive shaft having a transmission member mounted thereon, actuating mechanism for said solder feeding means having a driven member normally in releasable engagement with said transmission member, a rocker element operable to disengage said driven member, a longitudinally movable bar having operative connection with said rocker element and resiliently impelled to move said rocker element into position to disengage said driven member, a pivoted lever, latch means carried by said lever adapted to engage said bar, means on said belt operable when said carriage is in inward position to move said lever and latch and thereby move said bar and rocker element to cause engagement of said driven member with said transmission member, and means operable by a revolution of said holding head to release said latch means from said bar and cause the disengagement of said driven member.

28. In a can soldering machine, a rotatable can-holding head, and means for intermittently actuating said head comprising, transmission mechanism including a pair of selectively interengageable members, a longitudinally movable bar controlling the interrelation of said members, a pivoted lever, a latch carried by said lever adapted to engage said bar, a second lever carried by said first lever operatively connected to said latch, a stud on said rotatable head, means for swinging said first lever thereby shifting said bar into position for starting said transmission mechanism, said swinging movement carrying said second lever into the path of said stud, said second lever being operable by said stud to release said latch from said bar at the completion of a revolution of said head, and resilient means for returning said bar to position for disengaging said transmission members.

29. In a soldering machine, means for rotatably supporting a can body having an annular bottom seam, an inclined slideway, a carriage slidably mounted on said slideway having an arm adapted to enter said can with the downward movement of said carriage, a soldering copper swingably supported on said arm, a lever pivoted on said carriage having an operative connection with said copper, said lever having a limited movement in relation to said carriage, means adapted for operative engagement with said lever to raise said copper and withdraw said carriage when operated in one direction, and to lower said carriage and release said copper into contact with said seam when operated in the opposite direction.

30. In a can soldering machine, a device for rotatably supporting a can body, a soldering copper, a reciprocatory carriage adapted to carry said copper to and from contact with said can body, means for actuating said carriage, a drive shaft, a driving member mounted on said shaft, transmission mechanism movably mounted for selective engagement with said driving member, said transmission mechanism having constant engagement with said carriage actuating means and being normally disengaged from said driving member, means operable to move said transmission mechanism into engagement with said driving member and thereby actuate said carriage actuating means to move said carriage toward said can body, and automatic means operable by said carriage actuating means to release said transmission mechanism from engagement with said driving member and thereby arrest the movement of said carriage actuating means.

31. In a can soldering machine, a device for rotatably supporting a can body, a soldering copper, a reciprocatory carriage adapted to carry said copper to and from contact with said can body, means for actuating said carriage, a drive shaft, a driving member on said shaft, a transmission mechanism movably mounted for selective engagement with said driving member, said transmission mechanism having constant engagement with said carriage actuating means and being normally in position of disengagement from said driving member, automatic means operable by said can rotating device for moving said transmission mechanism into engagement with said driving member and thereby actuate said carriage actuating means to move said carriage away from said can body, and automatic means operable when said carriage reaches its outward position to release said first automatic means and disengage said transmission mechanism from said driving member, thereby arresting the movement of said carriage actuating means.

In witness whereof we have hereunto attached our signatures.

GEORGE W. WILLIAMS.
AXEL M. WALSTROM.